United States Patent [19]

Kenny et al.

[11] 4,052,035

[45] Oct. 4, 1977

[54] REMOTELY-CONTROLLED VALVE

[75] Inventors: Shaun S. Kenny; Leonard J. Armstrong, both of Staten Island, N.Y.

[73] Assignee: Conservocon, Inc., Staten Island, N.Y.

[21] Appl. No.: 633,797

[22] Filed: Nov. 20, 1975

[51] Int. Cl.² .................... F16K 31/143; F16L 27/04
[52] U.S. Cl. ...................................... 251/14; 239/586; 251/57; 251/295; 285/270
[58] Field of Search ................... 222/179; 251/57, 295, 251/14; 239/449, 562, 559, 578, 460, 569, 583, 586; 285/261, 270

[56] References Cited

U.S. PATENT DOCUMENTS

| | | | |
|---|---|---|---|
| 1,915,716 | 6/1933 | Bradshaw | 251/57 X |
| 2,303,478 | 12/1942 | McLean | 239/578 X |
| 2,374,200 | 4/1945 | Heigis | 251/57 X |
| 2,527,848 | 10/1950 | Track | 239/562 X |
| 2,564,938 | 8/1951 | Warren | 285/261 X |
| 2,874,001 | 2/1959 | Webb | 239/559 X |
| 2,997,851 | 8/1961 | Trubert et al. | 251/57 X |
| 3,036,780 | 5/1962 | Nelson | 239/569 X |
| 3,358,934 | 12/1967 | Moen | 239/449 X |
| 3,536,294 | 10/1970 | Rodriguez | 251/295 X |

FOREIGN PATENT DOCUMENTS 2,305,361  8/1974  Germany .............................. 239/569

Primary Examiner—Johnny D. Cherry
Assistant Examiner—Andres Kashnikow
Attorney, Agent, or Firm—Kenyon & Kenyon, Reilly, Carr & Chapin

[57]  ABSTRACT

A remotely-controlled valve is disclosed having a faucet-attachable control valve member and a foot-control member for generating air or water pressure which is communicated to the control valve member by means of a flexible tube or conduit. The air or water pressure urges a piston and a rigidly attached rod within the control valve member against a control ball valve away from an aperture connecting a first water chamber connected to the water supply from the faucet and a second water chamber connected via an exit passage to a spray head. Manual override means are provided to force the control ball valve in an open position regardless of the operation of the foot-control member.

5 Claims, 8 Drawing Figures

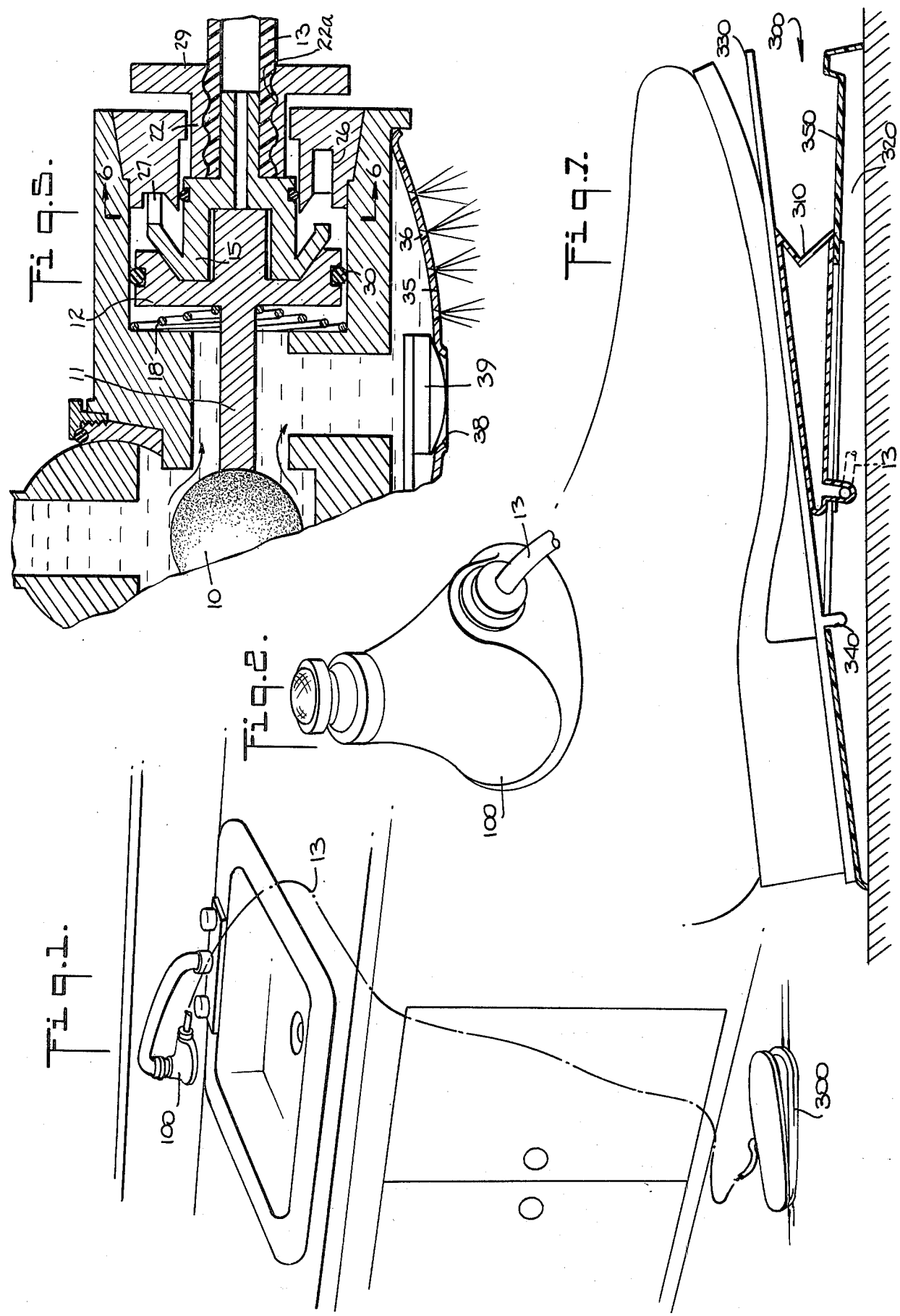

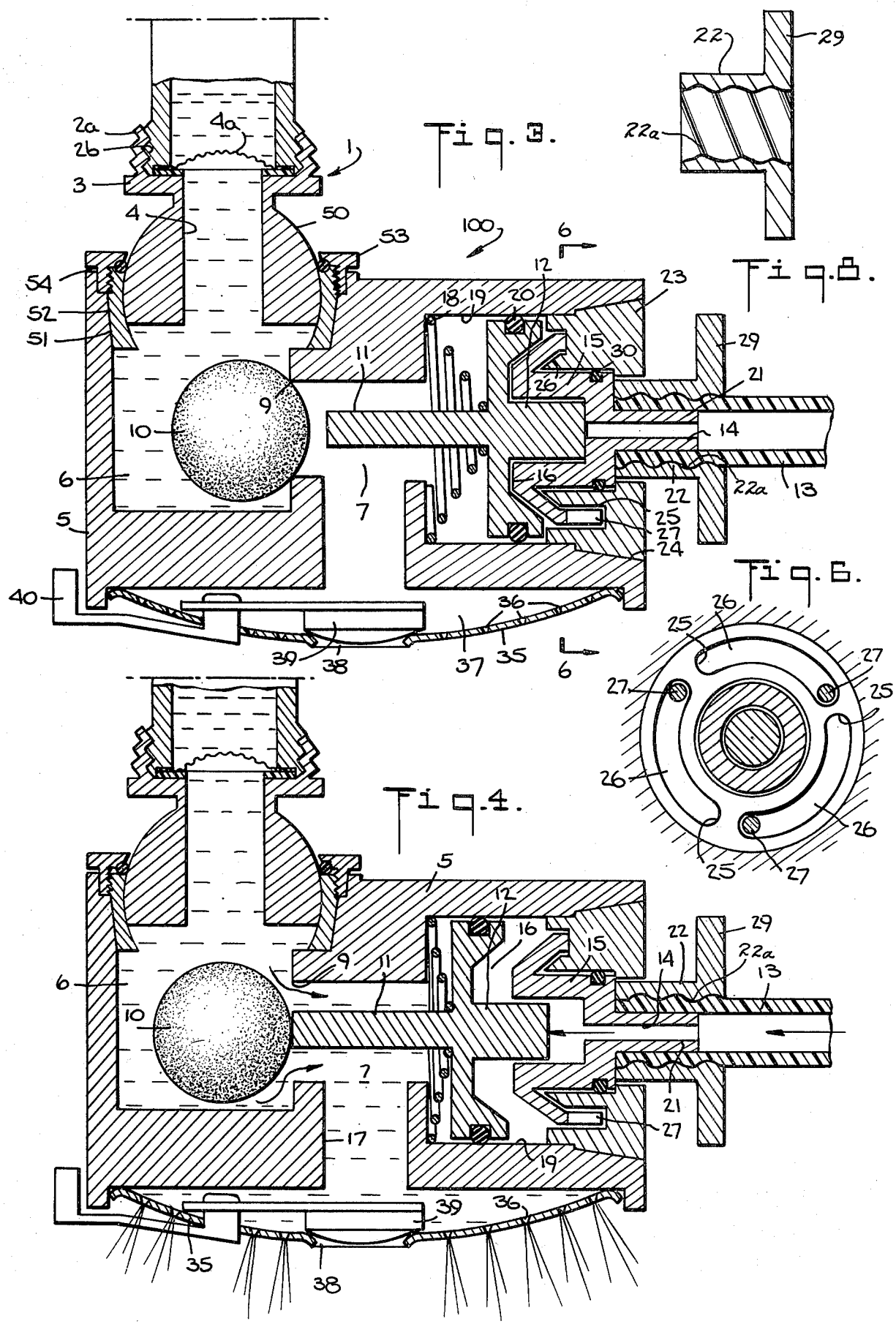

REMOTELY-CONTROLLED VALVE

BACKGROUND OF THE INVENTION

1. Field of the Invention

The general field to which this invention pertains is remotely-controlled valves. Specifically this invention relates to foot-operated valves for faucets useful in homes, hospitals, laboratories and the like.

2. Description of the Prior Art

Foot-operated valves are known for use in medical and laboratory sink applications where the hands must be free while controlling faucet water flow. Inexpensive remotely-controlled valves for domestic use in bathroom and kitchen sinks have not been widely accepted primarily due to their lack of inexpensive, yet reliable valve mechanism. U.S. Pat. No. 3,536,294 discloses a foot-operated control valve attachment to a faucet where the valve mechanism uses a flexible diaphragm as the controlled element in the valve to open or close a water passage.

U.S. Pat. No. 2,839,264 discloses a foot-operated control valve where the control valve mechanism is a spring loaded plug.

U.S. Pat. No. 3,638,680 discloses a foot-operated electrical control means for controlling the flow and mix proportions of hot and cold water. Electrically controlled valves control water flow in the hot and cold supply lines.

U.S. Pat. No. 3,786,995 discloses a spray device for attachment to a faucet in which a ball valve member is used to direct water from a supply line to one of two outlet ports, one of which exits through an aerating device and the other of which discharges through spray forming passages.

U.S. Pat. No. 2,608,205 discloses a safety valve in which a ball valve member for a butane tank is opened by means of water pressure created by the activation of a solenoid. If the supply were to be ruptured, the water pressure is released thereby automatically closing the valve.

U.S. Pat. No. 2,849,208 discloses the use of a valve ball as a control valve member in a garden sprayer. A manual actuator forces the valve ball from its seat to allow water to flow through the sprayer.

In overcoming the disadvantages of the prior art, the remotely-controlled valve described hereinafter has a primary advantage in that it provides an inexpensive extremely reliable control element.

A feature of the invention is that it is provided with a reliable manual means to override the remote-control feature.

Another feature is that it is provided with means to control the direction of water flowing from that faucet.

Another feature is that it is provided with means to produce a spray or direct flow of water.

SUMMARY OF THE INVENTION

These and other objects, advantages and features are embodied in a novel remotely-controlled valve attachable to the spout of a faucet for the control of water flowing therethrough. A control valve member is provided with adapting means for attaching it to a faucet. The valve member has a first chamber for accepting water from the faucet via a water inlet passage. A second chamber is provided having an exit passage for directing water out of the control valve member. The first and second chambers are connected by means of an aperture which may be sealed by means of a valve ball within the first chamber. The force of water entering the first chamber from the faucet forces the valve ball against the aperture thereby sealing it and preventing water flow from the first chamber into the second chamber. A foot-operated control member is provided to generate air or water pressure in a flexible conduit which is attached to the control valve member. The air or water pressure is used to urge a piston, and a rigidly attached actuating rod, within the control valve member, against the valve ball. By such action the valve ball is moved away from the aperture in opposition to the force on the valve ball from the water in the first chamber. Water is then free to pass the aperture into the second chamber and out of the control valve member.

An assistance spring is provided between the piston and the body of the control valve member to provide a restraining force against the piston when the foot-operated member is no longer generating air or water pressure applied to force the piston and the actuating rod against the valve ball. This restraining force allows the valve ball to close the aperture opening between the first and second chambers when water pressure in straining force allows the valve ball to close the aperture open— the first chamber is insufficient to force the valve ball and piston back to a closed position.

A spray head is provided to accept water exiting through the exit passage and force it through small holes or alternatively through a direct flow outlet which may be stoppered by means of a built-in stopper. The valve control member is provided with a threaded adapter to connect it to the faucet and with a swivel ball-bushing mechanism for directing the exiting water in various directions with respect to the faucet.

A mechanism is provided for manual override of the remote control force such that the control-valve member may be locked to an open flow position.

The remote-control force is provided by a foot-operated control member having a bellows placed between a foot pedal and a base. Depression of the foot pedal causes the bellows to force air or water under pressure via a flexible conduit to the control valve member.

BRIEF DESCRIPTION OF THE DRAWINGS

This invention, as well as its objects, advantages and features, will be better understood by reference to the following detailed description of the preferred embodiment of this invention taken in conjunction with the accompanying drawings in which:

FIG. 1 is a perspective drawing of the remotely-controlled valve according to the invention attached to a faucet for a kitchen sink, FIG. 2 is a larger perspective drawing of the control valve member according to the invention, FIG. 3 shows by means of a cross section taken through the internal parts of the control valve member according to the invention, FIG. 4 shows the control valve member forced in an open position by air or water pressure from a foot-operated control member according to the invention, FIG. 5 shows the control valve member forced in an open position by a manual override system according to the invention, FIG. 6 shows a lateral cross section through control valve member illustrating the mechanical construction of the manual override feature according to the invention, and FIG. 7 shows a foot-operated control member according to the invention.

FIG. 8 shows a threaded cylindrical member used to secure a flexible conduit to the control valve member.

DESCRIPTION OF THE INVENTION

FIG. 1 shows the invention in place attached to a kitchen sink faucet. A control valve member 100 is attached to the faucet. Water flow is controlled by a force generated by foot-operated control member 300 which transmits air or water under pressure to control valve member 100 via flexible conduit 13.

FIG. 2 shows a larger view of the control valve member 100.

FIG. 3 shows a longitudinal cross section through the control valve member. The control valve member 100 is connected to a faucet by means of adapter 1 which has male threads 2a outside and female threads 2b inside so that the control valve member 100 may be attached to threaded faucets of both types. Knurled flange 3 of the adapter provides a means for turning the threads into place on the faucet. A filter washer 4a is provided to remove particles from the water supply at the entrance of inlet passage 4.

The body 5 of control valve member 100 is connected to adapter 1 by means of a swivel ball 50, which allows control valve member 100 to be turned with respect to the faucet to which it is attached. The swivel ball 50 is rotatable and is held by a swivel bushing 51 which can be attached to valve body 5 by means of an ultrasonic weld 52. A swivel collar 53 retains swivel ball 50. An "O" ring 54 prevents water from leaking from the valve member 100 past the swivel ball 50.

The body 5 of control valve member 100, formed of metal or a suitable synthetic plastic, encloses an inlet chamber 6 for incoming water and an outlet chamber 7 for exiting water. Inlet chamber 6 and outlet chamber 7 are connected by means of an aperture 9. A valve ball 10 is provided within inlet chamber 6 which is forced by the pressure of the water in inlet chamber 6 against aperture 9, thereby sealing outlet chamber 7 from the flow of water.

Valve ball 10 is urged away from aperture 9, allowing water to flow therethrough by means of rod 11 rigidly attached to piston 12. In the remote control mode, piston 12 moves in the direction of the valve ball when force is applied to it by means of fluid or air pressure conducted by flexible conduit or tube 13. A manual control mode for moving the piston is described below.

When air or water pressure is transmitted via conduit 13 through pressure inlet 14 of piston guide 15, the pressure is applied to the end of piston 12 throughout valve open chamber 16. The pressure applied to piston 12 urges it and its rigidly attached rod 11 against valve ball 10 allowing water to flow from inlet chamber 6 through aperture 9 and into chamber 7 as shown in FIG. 4. Water then is expelled through outlet passage 17.

A low water pressure assistance spring 18 (FIG. 3), attached between control valve member body 5 and the piston 12 assists in returning the piston 12 to a closed position when air or water pressure via passage 14 is no longer applied. Low water pressure assistance spring 18 assures that valve ball 10 closes, even if the water pressure in inlet chamber 6 is not sufficient to move valve ball 6 against rod 11, thereby pushing piston 12 back to normal position.

Piston 12 moves within cylinder bore 19 which is open to outlet water chamber 7. The walls of cylinder bore 19 cut in valve body 5 are smooth, allowing piston 12 to move easily in both directions. After valve ball 10 is open, cylinder bore 19 is filled with water. The pressure of this water acts on piston 12 and assists in returning it to a normal or closed position when pressure is no longer applied via conduit 13. A piston "O" ring 20 in piston 12 assures that water from bore 19 does not pass to the other side of piston 12.

The piston guide 15 has an annular shape which provides a guide-way for piston 12, thereby preventing piston 12 from rocking in cylinder bore 19. Attached to the piston guide 15 is an inlet member 21 about which conduit 13 is snugly attached by means of a threaded tubing clamp 22. Inlet member 21 is hollow, forming passage 14 which enables a flow of water or air under pressure from conduit 13 to impinge on piston 12. Piston guide 15 is retained within the control valve member 100 by means of cylindrical cap 23. Cylindrical cap 23 can be sealed to valve body 5 by means of an ultrasonic seal 24.

Threaded tubing clamp 22 is part of an override thumb ring 29 which contains thread 22a on the inside of the clamp. When clamp 22 is screwed over the tubing clockwise to secure the tubing to inlet 14 of guide 15, onto tubing clamp 22, clamp 22 butts and becomes secured against piston guide 15 creating a jam nut effect. Thus, piston guide 15 can be rotated within cylinder cap 23 by rotating clamp 22 by ring 29. Rotation of guide 15 causes it to be translated linearly to and fro in the direction of piston 12 by the clockwise-counterclockwise rotation of override thumb ring 29. Three rider guide pins 27, shown in FIG. 6, which is a lateral cross section through cylinder cap 23, slide along the three separate rider slopes 26 in cap 23 with a cam-like action. When the pins hit stops 25 which are part of cylindrical cap 23, the rotation of the guide is terminated. The override thumb ring 29 can be rotated approximately one hundred degrees clockwise, during opening of the valve. The resulting translation of piston 12 and its rigidly attached rod opens valve ball 10 as shown in FIG. 5. Turning override thumb ring 29 in a counterclockwise direction translates piston guide 15 away from piston 12 allowing piston 12 to be urged by spring 18 away from valve ball 10. An "O" ring 30 is provided in piston guide 15 to prevent water or air pressure from valve open chamber 16.

A spray head 35 is attached to valve body 5 for conditioning water exiting from exit passage 17 (FIGS. 4 and 5). Spray head 35 is a curved or arched plate through which spray holes 36 are formed. Between spray head 35 and body 5, a spray head pressure chamber 37 is formed. This chamber 37 will produce water pressure therein because the volume of water entering it through exit passage 7 is greater than that passing through holes 36. Spray head pressure behind spray head is desirable in two respects. Water pressure will prevent residue from collecting in holes 36 and it will assist, via the water in cylinder base 19, piston 12 to return to the closed position when air or water pressure in the conduit 13 is released.

Spray head 35 has a direct flow outlet 38 allowing water from pressure chamber 37 to pass directly out in a solid stream for filling bottles, irons, etc. A stopper 39, connected to stopper handle 40 is provided as a manual means for closing off the direct flow outlet 38 as shown in FIG. 4.

Foot-operated control member 300 is shown in FIG. 7. A foot pedal base 320 is provided as a foundation for foot pedal 330. The pedal and base are of sufficient strength to withstand the weight typically applied by the foot of a human being. Pivot 340 is provided to allow the foot pedal 330 to arch downward upon bellows 310. Bellows 310, when compressed between foot pedal 330 and bellows support 350, compresses air or water forcing it along flexible conduit 13 connected to control valve member 100. When bellows 310 is no longer being compessed, as when a user lifts his toe, a vacuum created by the reverse action of bellows 310 causes the presence of air or water pressure in flexible conduit 13 to be terminated, thereby enabling closure of ball valve 10 in control valve member 100. In a preferred embodiment of foot control member 300, foot pedal 330 and bellows 310 are molded in one piece from a material such as synthetic rubber or plastic.

Various changes and modifications may be made in the details of construction and design of the above specifically described embodiment of this invention without departing from the spirit thereof, such changes and modifications being restricted only by the scope of the following claims.

What is claimed is:

1. A remotely-controlled valve attachable to the spout of a faucet for the control of water flowing therethrough comprising:
   a foot operated control member,
   a control valve member having adapting means to attach it to a faucet, said valve member having a body enclosing a first chamber for accepting water from said faucet from a water inlet passage and a second chamber having a passage for directing exiting water from said control valve member, said first and second chambers being connected by means of an aperture, said first chamber having a valve ball placed within it, said valve ball being urged, by the force of water entering said first chamber from said faucet, against said aperture thereby preventing water flow from said first chamber to said second chamber, said control valve member connected to said foot-operated control member by means of a flexible conduit, said foot-operated control member, upon activation, applying fluid under pressure through said flexible conduit,
   a cylinder within said control valve member,
   a piston slidably disposed within said cylinder,
   a piston guide chamber slidably disposed within said chamber having attached thereto an inlet member about which said flexible conduit is connected, said inlet member having a hollow passage for fluid or air under pressure from said foot-operated control member,
   the flexible conduit connected to the end of said inlet member transmitting the fluid pressure therein to the end of the piston thereby causing said piston to slide within said cylinder in the direction of said valve ball, the actuating rod attached to said piston thereby moving said valve ball away from said aperture and allowing water to flow from said first chamber to said second chamber, and
   means for manually urging said piston and its rigidly attached rod against said valve ball thereby moving said valve ball away from said aperture and allowing water to flow from said first chamber to said second chamber, said manual urging means comprising a clamp extending about the exterior of the flexible conduit adjacent to the end of the inlet member of the piston guide for retaining the conduit to the inlet member, and an override thumb ring attached to the clamp, said piston guide chamber undergoing linear movement with respect to said valve body by means of manual force applied to said override thumb ring, said linear movement being transmitted from said piston guide to said piston and its rigidly attached rod to said valve ball.

2. The remotely controlled valve of claim 1 wherein said manual force provided to said cylindrical member causing it to undergo a linear movement with respect to said valve body is a rotational manual force provided to said threaded cylindrical member.

3. A remotely-controlled valve attachable to the spout of a faucet for the control of water flowing therethrough comprising:
   a foot-operated control member,
   a control valve member having adapting means to attach it to a faucet, said valve member having a body enclosing a first chamber for accepting water from said faucet from a water inlet passage and a second chamber having a passage for directing exiting water from said control valve member, said first and second chamber being connected by means of an aperture, said first chamber having a valve ball placed within it, said valve ball being urged, by the force of water entering said first chamber from said faucet, against said aperture thereby preventing water flow from said first chamber to said second chamber, said control valve member connected to said foot-operated member by means of a flexible conduit, said foot-operated control member, upon activation, applying fluid under pressure through said flexible conduit,
   a cylinder within said control valve member,
   a piston slidably disposed within said cylinder,
   an actuating rod rigidly attached to said piston,
   the flexible conduit being connected to the end of said cylinder transmitting the fluid pressure therein to the end of the piston thereby causing said piston to slide within said cylinder in the direction of said valve ball, the actuating rod attached to said piston thereby moving said valve ball away from said aperture and allowing water to flow from said first chamber to said second chamber, and
   an assistance spring connected between said piston and said body, said assistance spring providing a mechanical force against said piston in a direction away from said valve ball when said foot-operated member is not actuated, thereby insuring that the activating rod will not obstruct the valve ball from closing said aperture between said first and second chambers under the condition of low water pressure in said first chamber.

4. A remotely-controlled valve attachable to the spout of a faucet for the control of water flowing therethrough comprising:
   a foot-operated control member,
   a control valve member having adapting means to attach it to a faucet, said valve member having a body enclosing a first chamber for accepting water from said faucet from a water inlet passage and a second chamber having a passage for directing exiting water from said control valve member, said first and second chambers being connected by means of an aperture, said first chamber having a valve ball placed within it, said valve ball being urged, by the force of water entering said first chamber from said faucet, against said aperture thereby preventing water flow from said first chamber to said second chamber, said control valve member connected to said foot-operated control member by means of a flexible conduit, said foot-operated control member, upon activation, applying fluid under pressure through said flexible conduit, a cylinder within said control valve member, a piston slidably disposed within said cylinder, an actuating rod rigidly attached to said piston, the flexible conduit being connected to the end of said cylinder transmitting the fluid pressure therein to the end of the cylinder thereby causing said piston to slide within said cylinder in the direction of said valve ball, the actuating rod attached to said piston thereby moving said valve ball away from said aperture and allowing water to flow from said first chamber to said second chamber, and means for withdrawing said rod from contact with said valve ball when said foot-operated member is deactuated, thereby insuring that said valve ball closes said aperture between said first and second chambers under the condition of low water pressure in said first chamber, said withdrawing means including an assistance spring connected between said piston and said body, said assistance spring providing a mechanical force against said piston in a direction away from said ball when said foot-operated member is not actuated, and a pressure differential across said piston created by high water pressure in said second chamber and the absence of fluid pressure on the end of said cylinder when said foot-operated member is deactivated.

5. A remotely-controlled valve attachable to the spout of a faucet for the control of water flowing therethrough comprising:

a foot-operated control member, a control valve member having adapting means to attach it to a faucet, said valve member having a body enclosing a first chamber for accepting water from said faucet from a water inlet passage and a second chamber having a passage for directing exiting water from said control valve member, said first and second chambers being connected by means of an aperture, said first chamber having a valve ball placed within it, said valve ball being urged, by the force of water entering said first chamber from said faucet, against said aperture thereby preventing water flow from said first chamber to said second chamber, said control valve member connected to said foot-operated control member by means of a flexible conduit, said foot-operated control member, upon activation, applying fluid under pressure through said flexible conduit, a cylinder disposed within said control valve member, one end of said cylinder being open to said second chamber, the other end being closed to said second chamber, a piston slidably disposed within said cylinder, an actuating rod rigidly attached to said piston, the flexible conduit being connected to the other end of said cylinder transmitting the fluid pressure therein to the end of the cylinder thereby causing said piston to slide within said cylinder in the direction of said valve ball, the actuating rod attached to said piston thereby moving said valve ball away from said aperture and allowing water to flow from said first chamber to said second chamber, a sealing means between said piston and said cylinder for isolating the fluid in said flexible conduit from the water flowing through said valve, and an assistance spring connected between said piston and said body, said assistance spring providing a mechanical force against said piston in a direction away from said valve ball when said foot-operated member is not actuated, thereby insuring that the activating rod will not obstruct the valve ball from closing said aperture between said first and second chambers under the condition of low water pressure in said first chamber.

* * * * *